(12) United States Patent
Bodnariuc

(10) Patent No.: US 10,839,703 B2
(45) Date of Patent: Nov. 17, 2020

(54) PROACTIVE NETWORK SECURITY ASSESSMENT BASED ON BENIGN VARIANTS OF KNOWN THREATS

(71) Applicant: Fortinet, Inc., Sunnyvale, CA (US)

(72) Inventor: Dorian Bodnariuc, Kanata (CA)

(73) Assignee: Fortinet, Inc., Sunnyvale, CA (US)

( * ) Notice: Subject to any disclaimer, the term of this patent is extended or adjusted under 35 U.S.C. 154(b) by 550 days.

(21) Appl. No.: 15/396,011

(22) Filed: Dec. 30, 2016

(65) Prior Publication Data

US 2018/0190146 A1 Jul. 5, 2018

(51) Int. Cl.
*G09B 19/00* (2006.01)
*G09B 5/00* (2006.01)
*H04L 29/06* (2006.01)

(52) U.S. Cl.
CPC ............ *G09B 5/00* (2013.01); *H04L 63/1441* (2013.01); *H04L 63/205* (2013.01)

(58) Field of Classification Search
CPC .... G09B 5/00; H04L 63/1441; H04L 63/1443
USPC ........................................................ 434/118
See application file for complete search history.

(56) References Cited

U.S. PATENT DOCUMENTS

| | | | | |
|---|---|---|---|---|
| 7,356,736 B2 * | 4/2008 | Natvig | ................ | G06F 21/566 714/38.12 |
| 7,359,962 B2 * | 4/2008 | Willebeek-LeMair | ...... | H04L 29/06 709/223 |
| 7,418,733 B2 * | 8/2008 | Connary | ............... | H04L 43/045 709/224 |
| 7,436,297 B1 * | 10/2008 | Tucker | .................. | G08B 25/04 340/508 |
| 7,716,727 B2 * | 5/2010 | Phillips | ............... | H04L 63/1441 713/154 |
| 8,321,936 B1 * | 11/2012 | Green | ................ | H04L 63/1416 718/1 |
| 9,401,925 B1 * | 7/2016 | Guo | ..................... | H04L 63/1416 |
| 2005/0044418 A1 * | 2/2005 | Miliefsky | ........... | H04L 63/0272 726/4 |
| 2006/0020814 A1 * | 1/2006 | Lieblich | ............... | G06F 21/316 713/182 |

(Continued)

*Primary Examiner* — David L Lewis
*Assistant Examiner* — Shauna-Kay Hall
(74) *Attorney, Agent, or Firm* — Jaffery Watson Mendonsa & Hamilton LLP

(57) ABSTRACT

Systems and methods for performing a proactive assessment of the network security of a private network are provided. According to one embodiment, computer systems and users of the private network are caused to react to a benign variant of a network security threat ("benign threat") by deploying the benign threat within the private network. The benign threat is created by leaving in tact symptoms and propagation mechanisms associated with the network security threat and replacing malicious behaviors of the network security threat with tracking, monitoring and/or reporting behaviors implemented within the benign threat. Responsive to activation of the benign threat on a particular computer system by a particular user information is captured by the benign threat regarding an identity of the particular user. Training of the particular user regarding proper security habits is facilitated by reporting, by the benign threat, the captured information to a management server.

29 Claims, 8 Drawing Sheets

(56) References Cited

U.S. PATENT DOCUMENTS

| | | | |
|---|---|---|---|
| 2007/0271611 A1* | 11/2007 | Kwan | G06F 21/552 726/22 |
| 2009/0165132 A1* | 6/2009 | Jain | G06F 21/51 726/22 |
| 2009/0326899 A1* | 12/2009 | Ghorbani | H04L 63/1433 703/13 |
| 2009/0328209 A1* | 12/2009 | Nachenberg | G06Q 10/10 726/22 |
| 2010/0077481 A1* | 3/2010 | Polyakov | G06F 21/552 726/24 |
| 2012/0258437 A1* | 10/2012 | Sadeh-Koniecpol | G09B 5/00 434/362 |
| 2013/0055394 A1* | 2/2013 | Beresnevichiene | G06F 21/577 726/24 |
| 2014/0199663 A1* | 7/2014 | Sadeh-Koniecpol | G09B 5/00 434/118 |
| 2014/0199664 A1* | 7/2014 | Sadeh-Koniecpol | G09B 5/00 434/118 |
| 2015/0229664 A1* | 8/2015 | Hawthorn | H04L 63/1433 726/25 |
| 2016/0021142 A1* | 1/2016 | Gafni | H04L 63/1425 726/23 |
| 2017/0103674 A1* | 4/2017 | Sadeh-Koniecpol | G06F 21/55 |

* cited by examiner

PROACTIVE NETWORK SECURITY ASSESSMENT BASED ON BENIGN VARIANTS OF KNOWN THREATS

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2016, Fortinet, Inc.

BACKGROUND

Field

Embodiments of the present invention generally relate to network security. In particular, embodiments of the present invention relate to performing a proactive assessment of the network security of a private network by simulating an attempt to penetrate the network with a benign malware-like program, monitoring penetration achieved by the program and logging security missteps by participants of the network.

Description of the Related Art

Existing computer networks can vary from small networks having a few computing devices to very large networks that include numerous client devices, servers, network security devices (for example, firewalls, gateway devices, Intrusion Prevention Systems (IPS), Intrusion Detection Systems (IDS), etc.), and network equipment, which typically require strong protection from various existing network security threats, e.g., malicious attacks, viruses, worms, Trojan horses, hacking, phishing, ransomware, denial of service (DoS) attacks, unauthorized access and the like.

Improper network security implementations can compromise confidential data, lead to theft of information/identity, cause diversion of network traffic, cause piracy, or impact network components in an undesired manner. Organizations using a network ecosystem can shield their network objects/components from pervasive network security threats by constantly implementing policies/solutions such as by configuring a firewall to block unauthenticated network access, biometric identification for identity management, use of virtual private networking (VPN) for securely accessing remote networks and/or use of antivirus and/or heuristic scanning to protect the private network against malware/viruses and other inappropriate computer programs.

However, existing network security solutions are reactive in nature, which means that the networks are always one step behind the security threat context, making the impact of a network attack considerable. While network equipment/component can be secured to be compliant with a defined number of rules, user error while operating and/or using the network can result in breaches of security. Furthermore, network vulnerability scanners cannot access how much a network might be affected in case of an infection, and merely assess identified security holes on a scale from minor to major, say by simply scanning network objects against known security threats and reporting them as such. Therefore, techniques are incapable of assessing damage that might result from a security breach. Furthermore, existing antivirus and anti-malware solutions only protect as long as they are active, and they have a signature for the malware program at issue, leading to a situation in which although heuristic scanning can detect viruses without a signature, new viruses are likely to escape detection.

There is therefore a need for systems and methods that allow operators, administrators, or other stakeholders to evaluate users' response/behavior to various security threats, and also evaluate potential damage resulting from a security breach. Systems and methods are also required to assess impact on network security based on how various network components react to a given network security threat.

SUMMARY

Systems and methods are described for performing a proactive assessment of the network security of a private network. According to one embodiment, one or more computer systems of a private network and one or more users of the private network are caused to react to a benign variant of a network security threat by deploying the benign variant of the network security threat within the private network. The benign variant of the network security threat is created by leaving intact symptoms and propagation mechanisms associated with the network security threat and replacing malicious behaviors of the network security threat with one or more of tracking, monitoring and reporting behaviors implemented within the benign variant of the network security threat. Responsive to each activation of the benign variant of the network security threat on a particular computer system by a particular user PM information is captured by the benign variant of the network security threat regarding an identity of the particular user. Training of the particular user regarding proper security habits is facilitated by reporting, by the benign variant of the network security threat, the captured information to a management server. By evaluating the depth of propagation of the benign variant of the network security threat in the context of the user's access permissions and network configuration, network administrators can take corrective measures to increase the security of potentially affected systems.

Other features of embodiments of the present disclosure will be apparent from accompanying drawings and from detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
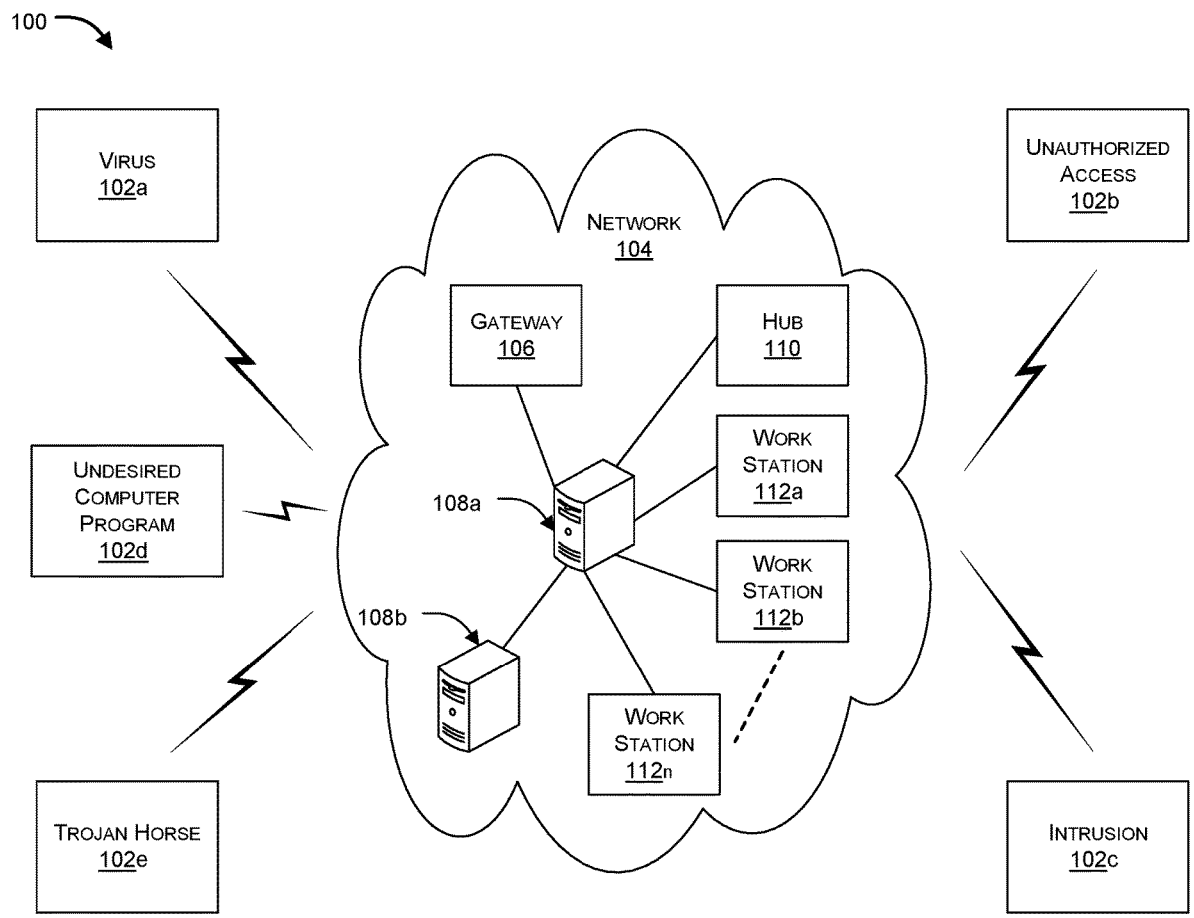
FIG. 1 illustrates an exemplary network architecture in which or with which embodiments of the present invention can be implemented.

Systems and methods are described for performing a proactive assessment of the network security of a private network. Embodiments of the present invention enable evaluation of the computer security of a network. Both the internal network, comprising computers, servers, and networking equipment, and the network operators and users may be evaluated. Security related breaches and/or irregularities may subsequently be reported to an administrator. In this manner, security administrators have the ability to take corrective measures at the equipment configuration level and/or by educating users regarding potential security threats.

According to one embodiment, one or more programs are injected into a network environment to be assessed/tested. The programs are benign variants of one or more network security threat samples, but which have been modified so as to remove or disable malicious or destructive behavior while retaining the symptoms and the distribution methods of real life security threats. By injecting the benign variant of a real security threat, an attempt to penetrate the network at issue can be simulated and observed security breaches resulting therefrom can be logged. A security breach in case of a virus infection may be facilitated by one or more or a combination of mishandling files, elevated security permissions on a client workstation, a temporary unavailable antivirus (e.g., out-of-date signatures), or various relaxed Intranet security rules. This approach can be compared to a vaccine, knowing the security threat, a benign form of the security threat (e.g., a virus) can be injected within a private network, and the organism (in the scenarios described herein, the network under test), will react to it. Based on the observed facilitating context, and reactions by users and network components within the network, the network can be fixed and/or patched without any incurring actual damage, whereas in the context of traditional reactive methods the impact on the network can be considerable.

Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

If the specification states a component or feature "may", "can", "could", or "might" be included or have a characteristic, that particular component or feature is not required to be included or have the characteristic.

Embodiments of the present invention generally relate to network security. In particular, embodiments of the present invention relate to performing a proactive assessment of the network security of a private network by simulating an attempt to penetrate the network with a benign malware-like program, monitoring penetration achieved by the program and logging security missteps by participants of the network.

According to one embodiment, a proactive assessment of network security of a private network is performed by installing a monitoring agent on each of multiple computer systems of a private network and causing one or more of the computer systems and one or more users associated with the private network to react to a benign variant of a network security threat by deploying the benign variant of the network security threat within the private network. The benign variant of the network security threat is created by leaving intact symptoms and propagation mechanisms associated with the network security threat and removing or disabling malicious behaviors of the network security threat. In an aspect, the monitoring agent detects activation of the benign variant of the network security threat on a computer system being used by a user, evaluates/assesses reaction of the user to the benign variant of the network security threat by monitoring activities of a process known to be associated with the benign variant of the network security threat, and responsive to said detection of the benign variant, captures information regarding an identity of the user, and facilitates training of the user regarding proper security habits by reporting the captured information to a management server or to an administrator of the private network.

In one embodiment, the monitoring agent can be configured to gather information regarding a security configuration of the computer system responsive to the detection of the benign variant, and report the gathered information to the management server. In another aspect, the monitoring agent can further be configured to gather information regarding a security configuration of computer systems to which the benign variant has propagated and facilitate proactive assessment of security of the private network by reporting the gathered security configuration information to which the benign variant of the network security threat was able to propagate.

In one embodiment, the monitoring agent can be configured to enable logging of information regarding various milestones achieved or security holes exploited within the private network by the benign variant of the network security threat. The milestones can be achieved or security flaws can be observed by including propagation or access by the benign variant of the network security threat to an identified critical system, port or network segment within the private network, use of an identified critical system by the benign variant of the network security threat, port or network segment within the private network, exploitation of a user permission level on the computer system by the benign variant of the network security threat, or an ability of the benign variant of the network security threat to exploit an access level of a server within the private network.

In one embodiment, deployment of the benign variant of the network security threat can be performed by sending an email having an attachment or an embedded link to one or more users associated with the private network. In an aspect, the email can employ social engineering to entice the users to open the attachment that contains therein the benign variant or select the embedded link that activates the benign variant of the network security threat. In an aspect, the benign variant can be signed using a certificate that is trusted by the private network, thereby preventing blockage of the benign variant of the network security threat by security services implemented within the private network.

In another aspect, prior to deployment of benign variant of network security threat, information can be received by the management server indicative of critical systems, ports, and network segments within the private network.

In one embodiment, a proactive assessment of the network security of a private network is performed by causing one or more computer systems of the private network and one or more users associated with the private network to react to a benign variant of a network security threat by deploying the benign variant of the network security threat within the private network. The benign variant of the network security threat may be created by modifying an existing network security threat—leaving intact symptoms and propagation mechanisms associated with the network security threat and replacing malicious behaviors of the network security threat with one or more of tracking, monitoring and reporting behaviors implemented within the benign variant of the network security threat. Then, as the benign variant of the network security threat propagates through the private network, it can capture information regarding, among other things, an identity of each user that activated the benign variant of the network security threat and on what computer system. Finally, by reporting the captured information, user training regarding proper security procedures can be facilitated.

FIG. 1 illustrates an exemplary network architecture 100 in which or with which embodiments of the present invention can be implemented. As illustrated, a computer network 104, e.g., a private network of an enterprise, can include multiple network devices/elements, e.g., a gateway 106, servers 108a-b (which may be collectively referred to as server(s) 108 hereinafter), a hub 110, a firewall (not shown), a switch (not shown), and one or more workstations 112a-n (which may be collectively referred to as workstation(s) or client(s) or client device(s) 112 hereinafter) that can be communicatively coupled to each other. Network attacks by, for example, a virus 102a, an unauthorized access 102b, an intrusion 102c, an undesired program 102d, a Trojan Horse 102e (which may be collectively referred to as network security threat(s) 102 hereinafter) may target one or more network devices/elements in an attempt to destroy, steal, alter or disrupt data/features/services pertaining to the attacked network devices associated with network 104.

Network 104 can facilitate communication between client devices 112 and internal or external servers (not shown). Network 104 may include any interconnecting system capable of transmitting audio, video, signals, data, messages, or any combination thereof. Network 140 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, including combinations thereof, operable to facilitate communication between the components.

In an aspect, a management server (not shown) may either be a part of the network 104 or can be part of another external network that is operatively coupled with network 104. The management server can be configured to perform various functions in order to inform a network administrator regarding various security threats affecting network 104. Management server may include a processor and a memory that performs the functions described herein. For example, memory may perform storage functions such as storing log(s) of actions performed (e.g., activation, distribution and the like) by a user in relation to a benign variant of a network security threat, and processor may analyze such logs to provide insight into, among other things, configurations of components to which the benign version of the network security threat was able to propagate (thereby allowing security holes to be identified) and how the benign version of the network security threat was activated in order to facilitate user training in relation to how network security threats need to be handled or reacted to. An example of a management server is described further below with reference to FIG. 2.

Figure 2:
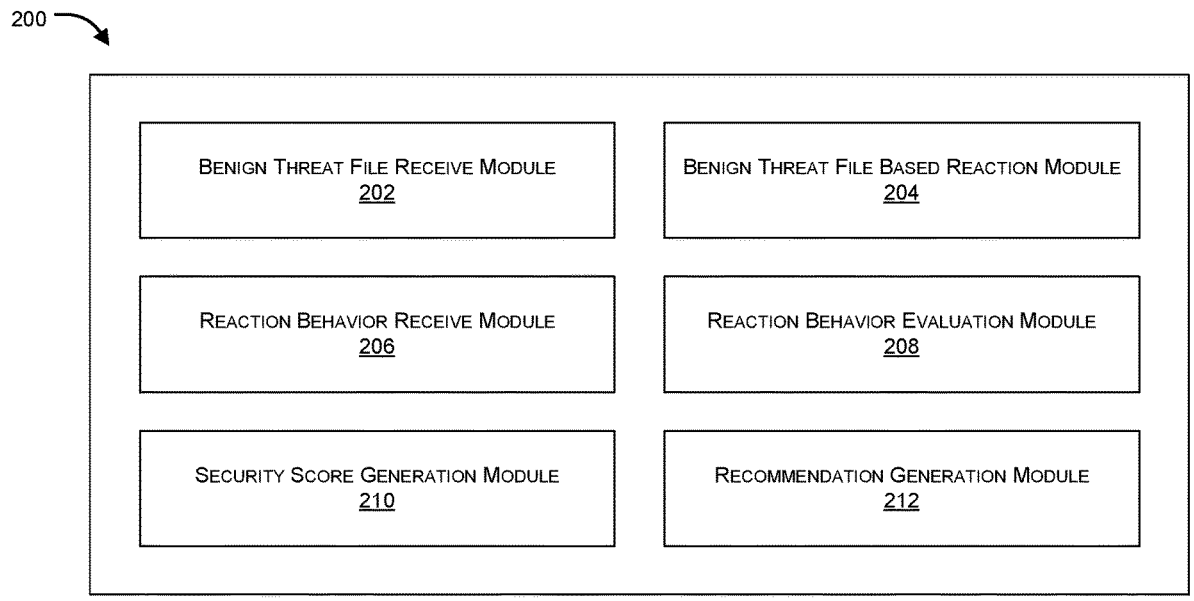
FIG. 2 illustrates an exemplary module diagram for a benign threat-based network security assessment system in accordance with an embodiment of the present invention.

FIG. 2 illustrates an exemplary module diagram for a benign threat-based network security assessment system 200 in accordance with an embodiment of the present invention. In the context of the present example, system 200 includes a benign threat file receive module 202 configured to receive a benign variant of a network security threat from a first computing device (e.g., a computer system residing outside of the private network). In one embodiment, the benign variant of the network security threat can be created by modifying an existing network security threat, leaving intact symptoms and propagation mechanisms associated with the network security threat and removing or disabling malicious behaviors of the network security threat. For instance, with respect to a known ransomware sample, malicious behavior (e.g., encryption of files) can be disabled or removed and only their symptoms and/or deployment/propagation/traversal mechanisms/features can be retained. Alternatively, the malicious behavior (e.g., encryption of files in case of ransomware), can be retained, but can be modified so that it is performed without permanent or negative impact, by, for example, using a known key, which allows any files encrypted to be easily decrypted.

In one embodiment, benign threat file receive module 202 can be configured to receive a benign variant (which may also be referred to as benign version or non-malicious variant) of a network security threat file from another computing device. The benign variant can be introduced into the network to be tested through any or a combination of an email, a Universal Serial Bus (USB) flash drive, or by any other suitable mechanism. In an aspect, the benign variant can be introduced or injected into the private network to be tested from an external computing/network device, for example, a hub, a server, an endpoint etc, in order to simulate the introduction of a typical network security threat.

System 200 further includes a benign threat file based reaction module 204 that enables tracking of reactions of one or more users and/or network components to the received benign variant of the network security threat. According to an embodiment, benign threat file based reaction module 204 can be configured to enable one or more network components of the network to react to benign variant of received network security threat file, wherein the network components can be selected from any or a combination of a network security device, a client device, a network equipment, and a server. In an aspect, in response to receiving the benign variant at a user computing device, the user may react to (or interact with) the received benign variant by performing one or more actions/operations including, but not limited to, downloading, accessing, opening, reading, executing, copying, forwarding, following specific instructions, writing, deleting, and the like, in relation to the benign variant. For example, in response to receiving the benign variant in the form of an email attachment, the user can react by downloading the attachment, forwarding the email to one or more other users, deleting the email, and the like. As another example of a reaction, a network component (e.g., a client workstation, a server or other network resource) may allow the benign variant of the network security threat to change configuration information of the network component at issue, change access permissions for a file and/or change a privilege of a process associated with the benign variant of the network security threat.

In an embodiment, a reaction behavior receive module 206 can be configured to receive reactions/behaviors of the one or more network component/users of the network with respect to the benign variant of a network security threat file. In an aspect, actions performed by the user with respect to the received benign file can be gathered/received by system 200, which can be a server, a workstation, a database, a data center and/or other configured device associated with the network under test or residing outside of the network under test.

In an aspect, reaction behavior receive module 206 can receive other data and/or statistics along with user reaction information, wherein the other data and/or statistics can include, but are not limited to, details of the "infected" computing device (for example, its Internet Protocol (IP) address, subnet mask, user name, port number(s), gateway information, source and destination address, Media Access Control (MAC) address and the like). In an aspect, system 200 can also receive other network device details. In an embodiment, user reaction to benign variant of network security threat, together with data and/or statistics regarding the "infected" computing device, can be received by system 200, which can then maintain a log of reactions/events pertaining to users in the same or a different simulated network security threat environment. In an embodiment, user reactions to the benign variant of network security threat, together with data and/or statistics of the user's computing device, can be transmitted to system 200 periodically (e.g., every 30 minutes, every two hours, every two days, monthly) or in real-time.

In another exemplary embodiment, a separate monitoring application/agent can be configured on one or more network components of a private network, wherein the monitoring agent can monitor changes in computer network component activities and/or configurations/settings. Such changes in the computer network component activities and/or configurations/settings can be in response to execution of or actions performed by or as a result of execution of the benign variant of the network security threat. In an aspect, the monitored information can be transmitted to system 200 for analysis. In an embodiment, network component activities can be transmitted (periodically or in real-time), say in the form of logs, to indicate network components accessed, files accessed and/or other actions taken by the benign variant, and the associated impact of each such action. In an alternate embodiment, benign variant can itself be capable of reporting to system 200 the activities it is undertaking, and no separate monitoring application may be required.

According to an embodiment, reaction behavior evaluation module 208 can be configured to evaluate reaction behavior of one or more network components or users with regard to the benign variant of the network security threat so as to proactively assess potential network security issues. In an aspect, benign variant can be distributed over one or more networks that may include multiple network components. In another aspect, benign variant can spread among multiple users, and therefore, in response to receiving reactions from the multiple users as the benign variant propagates through the network, analysis can be collectively or individually performed on such reactions to identify how each user or network component reacted to the benign variant and what impact/vulnerabilities such reaction created or resulted from. Analysis of reactions can include, but is not limited to, determination of usage patterns, security habits of participants, number of read only/preview attempts executed on attachments, altering access permissions for unauthorized users, etc.

Reaction behavior evaluation module 208 can also create analysis reports of simulated network environment, wherein such reports can be shared with one or more network administrators. Analysis report can elucidate negative impacts of the injected benign variant of the network security threat on the network. In an embodiment, analysis report can include IP addresses, subnet masks, user names, port numbers, gateway information, source and destination addresses, MAC addresses and/or other details pertaining to network components to which the benign variant was able to obtain access. In an aspect, evaluating reaction behavior of the one or more network components includes assessing changes in configuration of the one or more network components. In another aspect, evaluating reaction behavior of one or more network components can include assessing impact on one or more network components before, during, or after interacting with the benign variant of network security threat.

In an embodiment, security score generation module 210 can be configured to generate a security score for the network, for a component of the network and/or for a user thereof based on an evaluation of their respective reactions/behaviors. In an exemplary aspect, system 200 can associate a security threat score with one or more users or network components/elements that interacted with benign variant of network security threat, based on which, for example, access may be restricted or granted to such users or network components/elements. For instance, a first user that loosely interacted with benign variant of network security threat and triggered activation of the benign variant may be assigned more restrictive network access rights as compared to a second user that identified the benign variant as a potential threat and deleted it. In an aspect, such a security threat score may help an administrator control rights for different components or users and may also help the administrator identify network components having security holes. Furthermore, the administrator may use the security threat scores to identify users in need of security training. Such scores can further be used to access security details to identify potential critical systems, ports, datacenters, devices, software defined networks that can be negatively impacted by an infection.

In an exemplary implementation, threat scoring can be performed to categorize network components in various segments of impact, for example, categories of negatively impacted network components can be low-level risk components, medium-level risk components, high level risk components, and critical components. For example, if, because of a network component, a single user is infected, the component can be categorized in low-level risk components, whereas if a datacenter or a cloud server is infected, the component can be categorized as a critical component. Although the above examples have been given with respect to network components, a similar categorization, risk assessment, reaction behavior, and score allocation, among other features of the present disclosure can also be associated or performed for users of computing devices that are associated with the network and who react with one or more benign variants.

According to an embodiment, recommendation generation module 212 can be configured to generate at least one recommendation for the network, a component thereof or a user thereof based on evaluation of reaction behavior of one or more network components or users. In an aspect, recommendation generation module 212 can enable network operators or network administrators to analyze network component/user reaction report(s)/log(s), security breaches, impacted settings or configurations or rights, infected servers, user response towards benign variant(s), and damage caused so as to evaluate and determine measures to be taken to strengthen reaction to such network security threats, and accordingly educate users about handling of network security threats along with configuring impacted network components/devices/elements accordingly.

In an aspect, in response to negative impact of benign variant of network security threat, affected users can receive, from the administrator or from system 200 an infection impact report so that the affected users can appreciate the severity of the resulting infection and how to properly respond to a real security threat if and when it is encountered. For example, as a result of introducing the benign variant into the private network, users may learn the importance of identifying suspicious email messages and not opening attachments or selecting links embedded within such email messages and can be trained to inform a network administrator regarding the attempted attack (e.g., a phishing attempt).

Although some embodiments of the present invention have been explained with respect to use of one or more monitoring agents in the network or configured on each of a multiple computer systems of the network, in other embodiments, there may not be any monitoring agents and instead the benign variant of the network security threat may itself be capable of assessing reactions to it by one or more network components or users thereof, and accordingly transmit a log of such reactions or evaluation/impact of such reactions to a central management server or an administrator. In another aspect, the monitoring agent can be configured within the benign variant of the network security threat itself.

In an aspect, once the benign variant is activated/accessed, a monitoring agent can gather information regarding a security configuration of the computer system, and report the gathered information to a management server, for example. Monitoring agent can further be configured to detect propagation of the benign variant of the network security threat to an additional computer system, and accordingly gather and report the information regarding a security configuration of the additional computer system. In such a case, monitoring agent can further be configured to facilitate proactive assessment of security of the private network by reporting the gathered security configuration information for each of computer systems to which the benign variant of the network security threat was able to propagate.

In an exemplary implementation, deployment of benign variant of network security threat can be done by sending an email having an attachment to one or more users, wherein the email can employ social engineering to entice the one or more users to open the attachment, which contains therein the benign variant of the network security threat. In such a case, the attachment may also be signed using a certificate that is trusted by the network, thereby preventing blockage of the benign variant of the network security threat by security services implemented within the private network.

In another aspect, monitoring agent can be configured to log information regarding various milestones achieved or security holes exploited within network by the benign variant of the network security threat. The milestones achieved or security holes exploited can include, but are not limited to, propagation or access by the benign variant of the network security threat to an identified critical system, port or network segment within the private network; use by the benign variant of the network security threat of an identified critical system, port or network segment within the private network; exploitation by the benign variant of the network security threat of a user permission level on the computer system; or an ability by the benign variant of the network security threat to exploit an access level of a server within the private network.

In an aspect, prior to deployment of benign variant of network security threat, a management server may receive information identifying the critical systems, ports and network segments within network.

Figure 3:
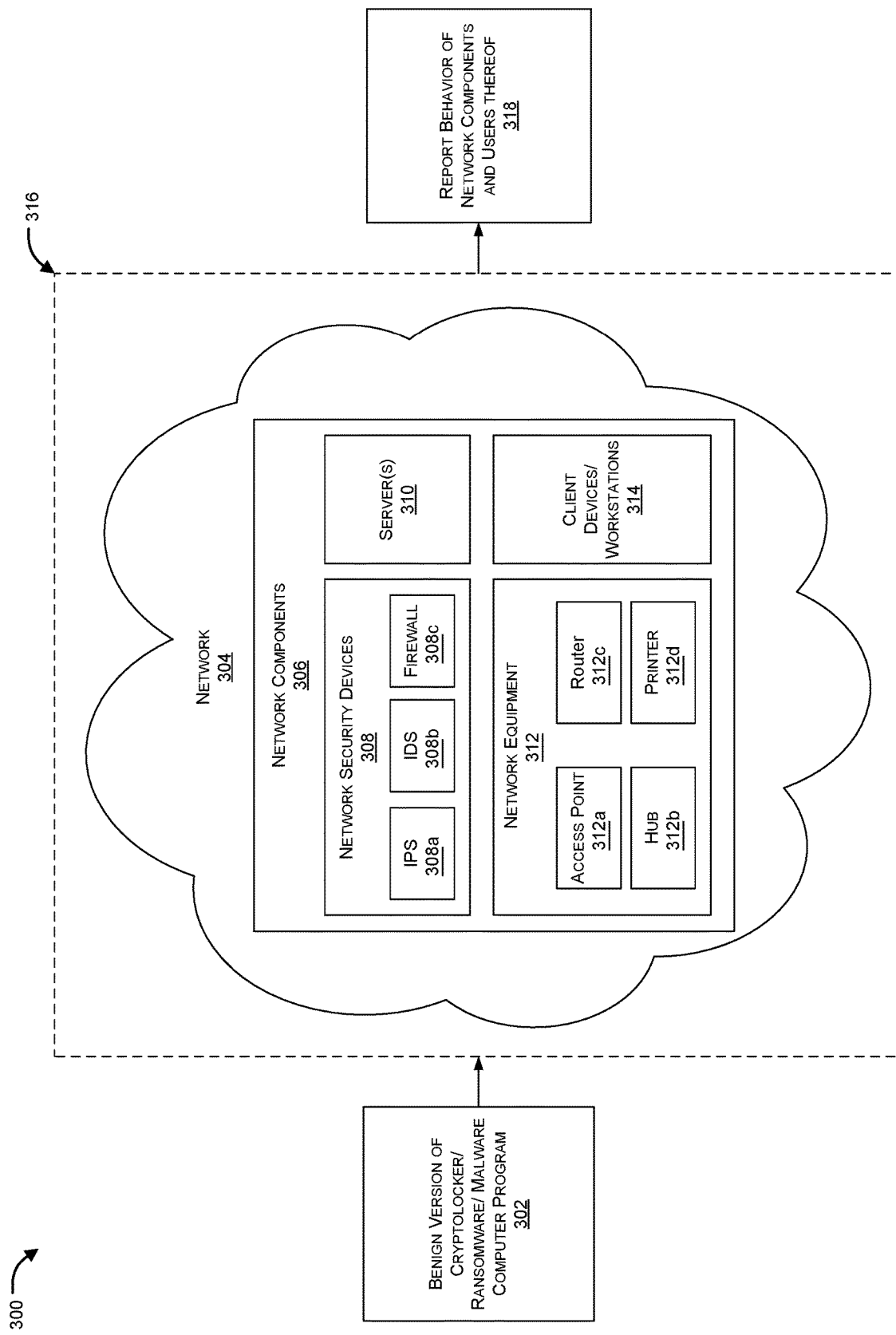
FIG. 3 illustrates a block diagram showing network security assessment based on interaction/behavior between one or more network components of a network and a benign threat.

FIG. 3 illustrates a block diagram showing network security assessment based on interaction/behavior between one or more network components or users of a network and a benign variant of a network security threat.

In the context of the present example a benign variant/version of a malicious program (which may also be referred to as a benign variant of a network security threat) is introduced into a network 304 that is to be tested. The benign variant of the network security threat can be based on any of a known ransomware sample, e.g., cryptolocker, a known spyware sample, a known virus sample, a known adware sample, a known Trojan horse sample or the like. In an aspect, the benign variant of the network security threat can be created by leaving intact symptoms and propagation mechanisms associated with the network security threat, and removing or disabling malicious behaviors performed by the network security threat. In an aspect, while the underlying network security threat upon which benign variant 302 is based would normally attempt to hamper performance of one or more network components 306 by slowing processing of data packets, crashing of network components, jamming of data packets, hacking of network information, blocking computing device access, diverting information from intended computing device(s), altering security configurations of a private network/cloud and the like, benign variant 302 may simply log and report the network resources it is able to gain access to during the testing process.

Although the present disclosure illustrates use of only one benign variant that is transmitted to network 304, those skilled in the art will appreciate that any number of benign variants of the same or different network security threats can be injected into network 304 concurrently or sequentially so as to simulate a network security threat environment.

In an exemplary embodiment, benign variant 302 can be injected in multiple forms from multiple sources, for example, via email, from web sources through the Internet, or from a USB flash drive, or other possible sources.

Block 316 illustrates various exemplary network components/elements that form part of computer network 304, which can receive and react to benign variant 302. Such network components 306 can include, but are not limited to, one or more network security devices 308 such as Intrusion Prevention System (IPS) 308a, Intrusion Detection System (IDS) 308b, and Firewall 308c, one or more server(s) 310, one or more network equipment(s) 312 such as access point 312a, router 312b, hub 312c, and printer 312d, and one or more client devices/workstations 314. Network security devices 308 can be configured to monitor and scan incoming data traffic, monitor network 304 or network components 306 for malicious attacks or policy violations, and/or monitor and control incoming and outgoing network data traffic based on preset/predetermined security rules/policies, or for any other configured purpose. Server(s) 310 can include web server(s), distributed server(s), online gaming server(s), print server(s), mail server(s), file server(s), and the like. Network equipment 312 can include multiple additional devices such as switches, gateways, controllers, among other like devices. Client devices/workstations 314, on the other hand, can be any or a combination of a computer systems, personal computers, tablet PCs, personal digital assistants (PDAs), smartphones, mobile phones, wearable computing devices, workstations, among others.

In an exemplary implementation, in response to receiving at least one reaction to benign variant 302 by at least one network component 306 or by a user of a network component 306, a management server can evaluate the reaction and take necessary steps to, for instance, reconfigure the concerned network component(s) or take an action on the concerned user, or train the user to enable improved/efficient detection and mitigation of actual network security threats. For instance, activation of benign variant 302 by one or more users may expose the users' client devices to modification of registry settings, alteration of protocol functioning, performance degradation of networked devices, exfiltration of private network data to unauthorized devices/users, modification of access permission levels, modify of OSI model layer functioning, or numerous other negative impacts. Based on reporting by benign variant 302 or through reported observations by monitoring agent(s) as described above, an administrator may take necessary corrective measures to educate users and/or otherwise seek to mitigate the damage performed by an actual encounter with a real network security threat. In another instance, one or more other users may be exposed to benign variant 302 without causing activation thereof by deleting the email or otherwise refusing to interact with benign variant 302. Such proper reactions may also be logged/reported by the monitoring agent for subsequent use by the administrator to encourage such actions and/or otherwise acknowledge these users.

In an embodiment, benign variant 302 may be activated via interactions by a user (e.g., by selecting a dubious web link or opening an email attachment). Alternatively, benign variant 302 may be activated upon introduction within network 304 or at a predetermined time without requiring user interaction.

Those skilled in the art will appreciate that while embodiments of the present disclosure are explained with respect to certain exemplary network components actual implementations/architectures may include other network components.

Block 318 represents a report (as described with respect to reaction behavior evaluation module 208) that can be generated and shared with one or more network administrators/operators. In an aspect, the behaviors/reactions of one or more users and/or one or more network components (e.g., routers, hubs, workstations, datacenters, firewalls, protocol functioning etc.) can be reported to facilitate analysis of the impact of (e.g., penetration level/severity) benign variant 302 on the network. Based on the reported information, one or more administrators or network authorities can take appropriate remedial action, including, but not limited to, training and educating network users regarding avoiding triggering/activation and spreading of network security threats, revising security policies and/or revising configurations of one or more of the network components of network 304.

In an embodiment, based on analysis of network components or users thereof that allowed access to, propagated, were impacted by or otherwise came into contact with benign variant 302, network administrators can take necessary actions to prevent damage or negative impact of future network security threats on network 304. For example, the administrator may determine there is a need for the installation of additional/smart firewalls, configuring antivirus scanning at possible entry-points, introducing IPS and/or IDS, disabling suspicious web links, filtering suspicious email attachments, among any other like actions.

Figure 4A:
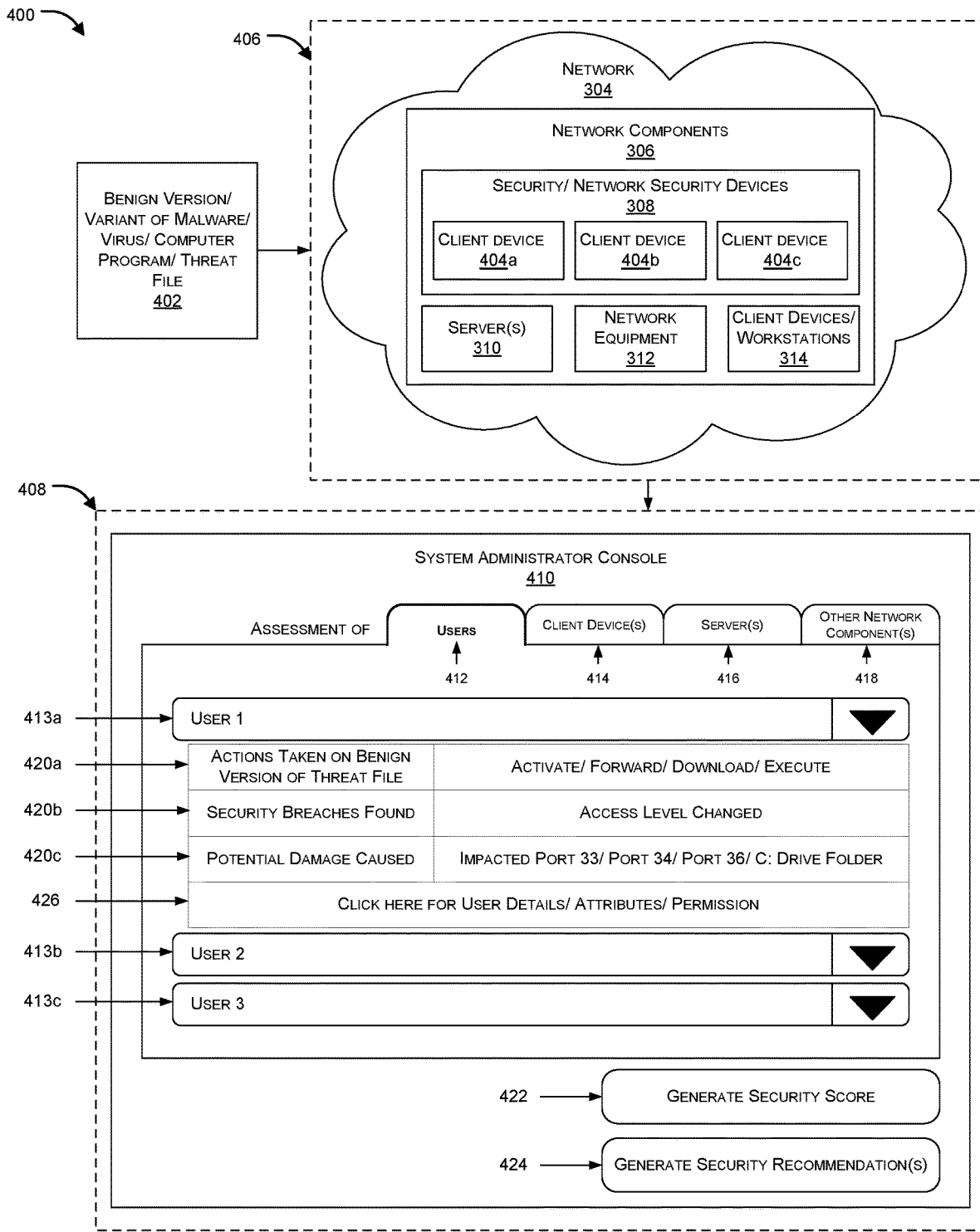
FIGS. 4A and 4B illustrate block diagrams showing network security assessment based on interaction/behavior between one or more network components of a network and a benign threat.
Figure 4B:
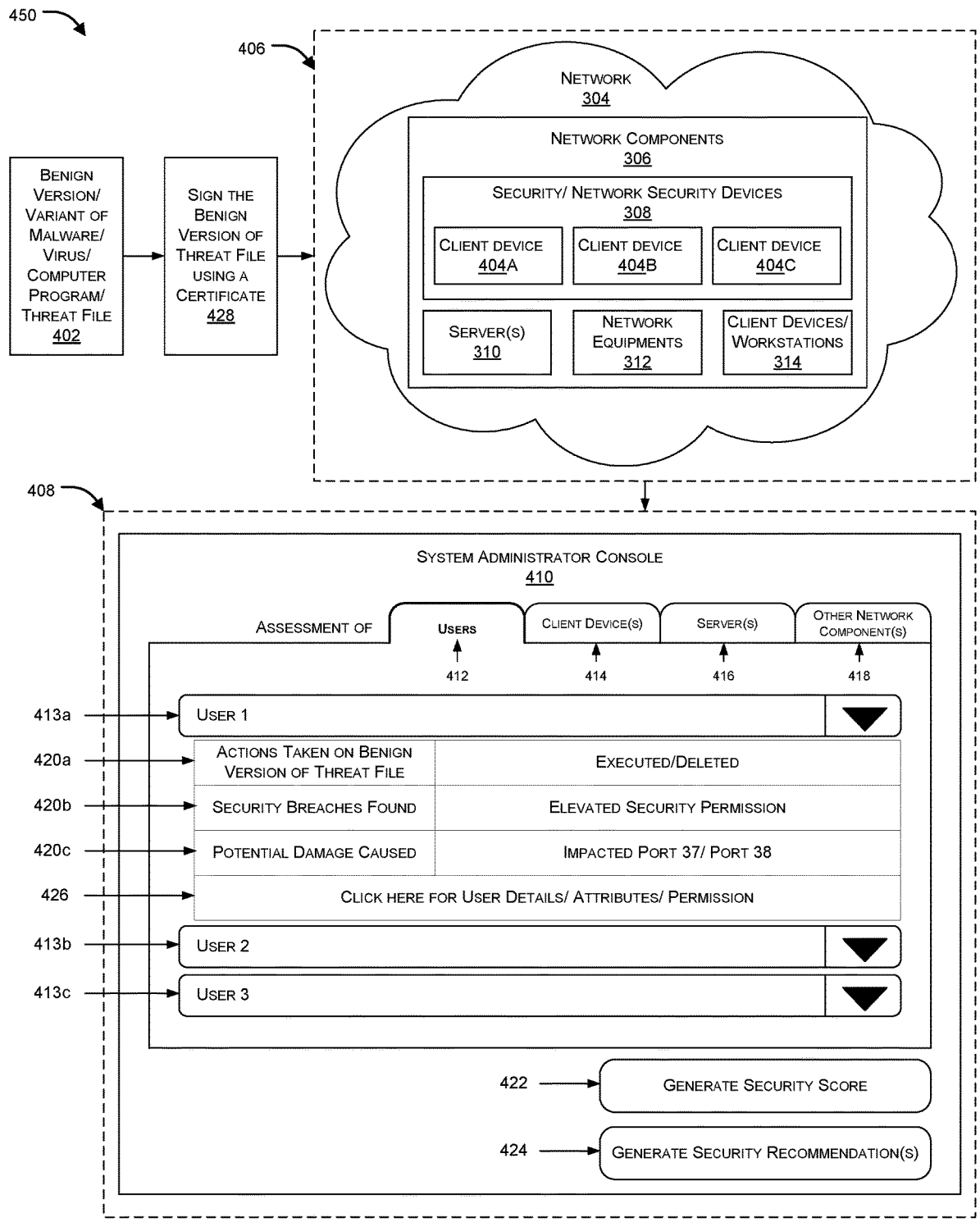

FIGS. 4A and 4B illustrate block diagrams showing network security assessment based on interaction/behavior between one or more network components of a network and a benign threat.

FIG. 4A illustrates benign version/variant of a malicious program 402 being received by a private network (e.g., network 304), wherein based on the reaction(s) by network components (e.g., network components 306 and/or users thereof) to benign variant 402, one or more monitoring agents (not shown), implemented within benign variant 202 and/or running on the network components, can identify and log reactions/activities to be sent to a management server accessible to an authorized network administrator. Such an administrator can, via his/her console 410, view various actions (for example, actions 420a) taken by different users 412 such as user 413a, user 413b, and so on. For instance, as can be seen under actions 420a for user 413a, this user performed activation, forwarding, downloading, and execution of benign variant 402. Additionally, execution of benign variant 402 resulted in a security breach 420b involving an access level change and potential damaged 420c includes impact to ports 33, 34, 36 in addition to one or more folders on the C drive of the user's computer system. Based on evaluation of such reactions and impact caused on the impacted network components (e.g., client devices), embodiments of the present invention facilitate automated and/or manual modification of any or a combination of user details, access rights, permissions, attributes, or may simply facilitate user security training to help users identify and avoid activating and/or propagating future network security threats.

In addition to assessment of the reactions of users 413a-c to benign variant 402, as explained above, embodiments of the present invention also enable evaluation of how client devices 414, servers 416, or other network components 418 behaved or interacted with or reacted to benign variant 402, and accordingly allow the network administrator to identify and take appropriate corrective action(s).

In another aspect, a security score 422 can also be generated for one or more network components, or users thereof, or for network 304 as a whole, or a part thereof based on how the concerned elements reacted to benign variant 402. A security score is a calculated value of multiple aspects. The assessment module has default security values for various outcomes on different targets. These values are based on industry best practices. Generally, a compromised server will have a higher impact on the security than a typical workstation. However, if a workstation is involved in data handling of financial transactions, both the given workstation and the user account/accounts accessing the respective workstation will be assigned higher scores by the local administrators. In this context, perceived scores can be lower than in reality, and the assessment will reveal this. For example, if a benign variant of a security threat is initiated on a workstation with low security score, but it is propagated on a SQL server holding important financial data, the workstation were the BVNST was initially activated will algorithmically inherit the give SQL server's security score. According to one embodiment, based on security score 422 or directly based on assessment of reaction behavior (or impact) one or more security recommendations 424, which may be preventive in nature, can be generated. Examples of security recommendations: user account permissions, server connectivity, firewall policies, user training. For example, certain malware, (hence BVNST), cannot operate under regular user account, and they need elevated account permissions. This is detected by the assessment module, and suggested in the report. Another example is a server that is only accessed by the Management. The assessment routine will probe for open TCP/IP ports from all the workstations in the network. It can then recommend to implement network segmentation, and allow access to the given server to only required network segments and users.

FIG. 4B shows another exemplary testing scenario in which benign variant 402 is signed by a certificate 428. In this scenarios, all files deployed for testing network 304 are signed with certificate 428 trusted by network 304 to ensure antivirus scanning employed by network 304 will not block the files and will allow the awareness, reactions and behaviors of the users (and not the detection capabilities of the antivirus scanning) to be measured. As will be appreciated by those skilled in the art, the reactions and/or behaviors in FIGS. 4A and 4B may be different because some of the functions performed by benign variant 402 may mimic malware, causing one or more functions performed by benign variant 402 to be blocked by antivirus and/or other network security prevention/protective mechanisms in the context of FIG. 4A. The antivirus software can be configured so that it allows the file to be executed, (the real-time scanner does not detect it as a threat), while user initiated scanning will detect the benign threat as malware.

Figure 5:
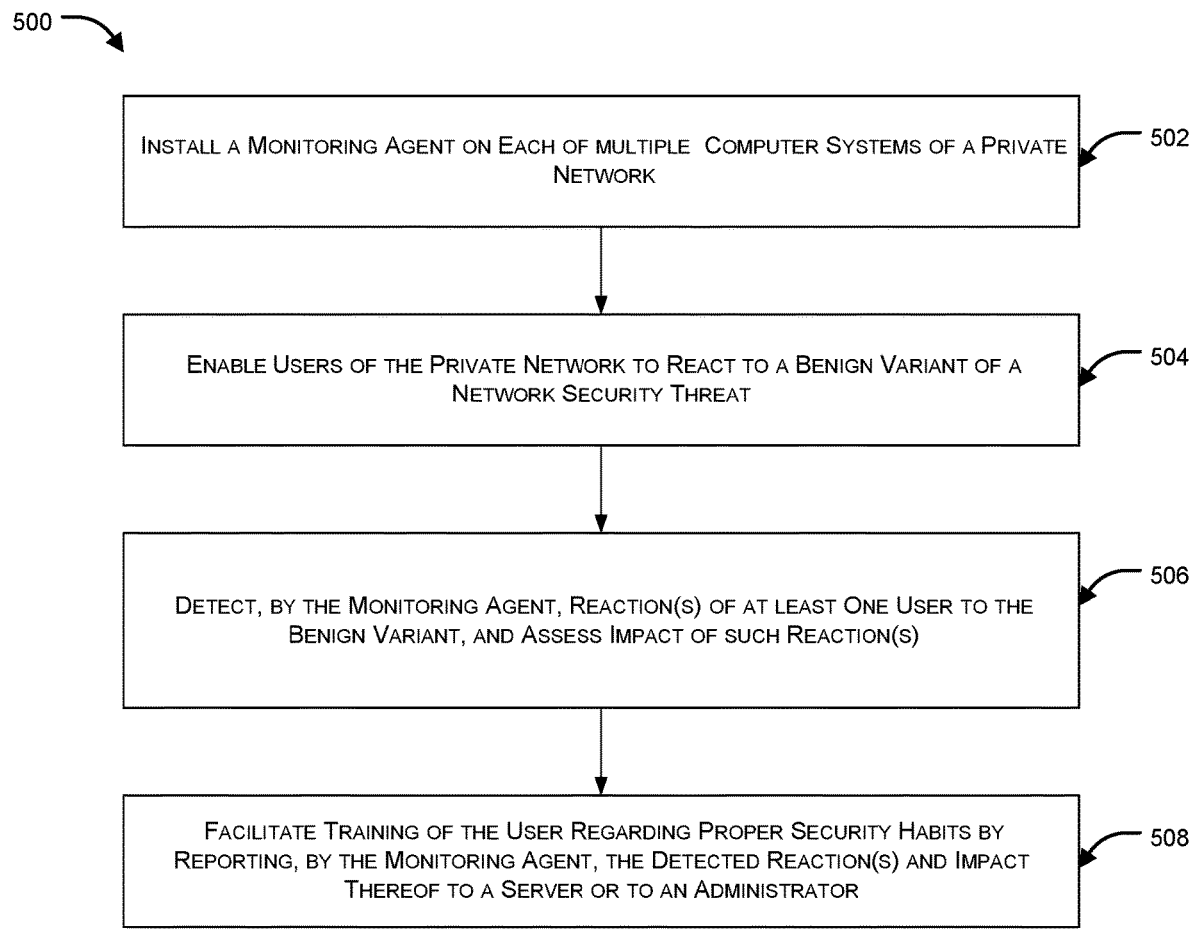
FIG. 5 is a flow diagram illustrating network security assessment processing in accordance with an embodiment of the present invention.

FIG. 5 is a flow diagram illustrating network security assessment processing in accordance with an embodiment of the present invention. In the context of the present example, at block 502, a monitoring agent is installed on each of multiple computer systems of a private network. As noted above and as described with reference to FIG. 6, in alternative embodiments, the benign variant of the network security threat may implement the monitoring functionality.

At block 504, causing one or more of the computer systems and one or more users of multiple users of the private network are caused to react to the benign variant of the network security threat by deploying the benign variant of the network security threat within the private network. As noted above, in one embodiment, the benign variant of the network security threat may be created based upon a sample of a known network security threat. The known network security threat may be modified by leaving intact symptoms and propagation mechanisms associated with the network security threat and removing or disabling malicious behaviors of the network security threat. The benign variant may be deployed within the network environment to be tested in the form of an email attachment, by way of an embedded link within an email message, via files stored on a USB drive or by way of various other methods.

At block 506, the monitoring agent detects activation of the benign variant of the network security threat on a computer system resulting from a reaction (e.g., opening of an email attachment, selection of a link within an email message, use of an infected USB drive) of a user of the computer system to the benign variant of the network security threat. The monitoring agent also monitors activities of a process known to be associated with the benign variant of the network security threat and captures, among other information, the identity of the user that activated the benign variant.

At block 508, training of the user regarding proper security habits can be facilitated by reporting by the monitoring agent the captured information to a management server or to an administrator of the private network.

Figure 6:
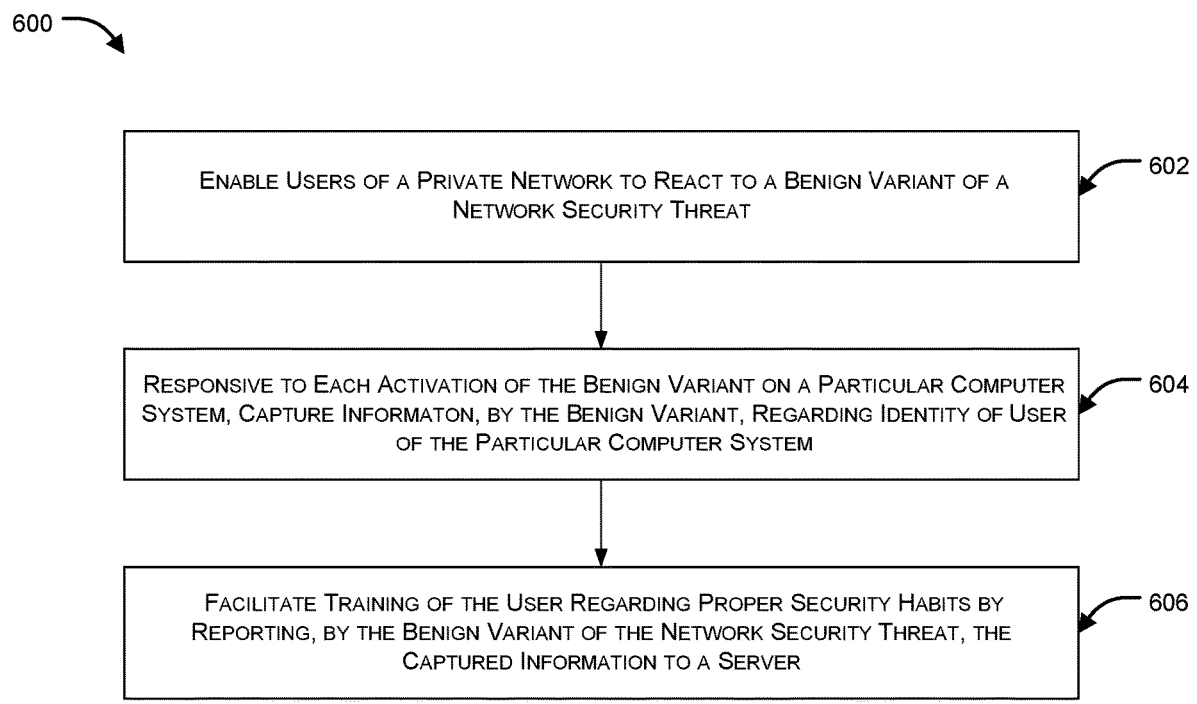
FIG. 6 is a flow diagram illustrating network security assessment processing in accordance with an alternative embodiment of the present invention.

FIG. 6 is a flow diagram illustrating network security assessment processing in accordance with an alternative embodiment of the present invention. In an aspect, the proposed method can include the steps of, at step 602, causing one or more computer systems of multiple computer systems of a private network, and one or more users of multiple of users of the private network to react to a benign variant of a network security threat by deploying the benign variant of the network security threat within the private network.

At step 604, responsive to each activation of the benign variant of the network security threat on a particular computer system within the network being tested by a particular user of the multiple users associated with the network being tested, information can be captured, by the benign variant of the network security threat, including, but not limited to information regarding an identity of each of the users that interacted with the benign variant, information regarding a computer system or other network component within network to which the benign variant was able to propagate or impact, information regarding the configuration of the computer system and/or network component at issue.

At step 606, user training regarding proper security habits is facilitated by reporting, by the benign variant of the network security threat, the captured information to a management server.

Figure 7:
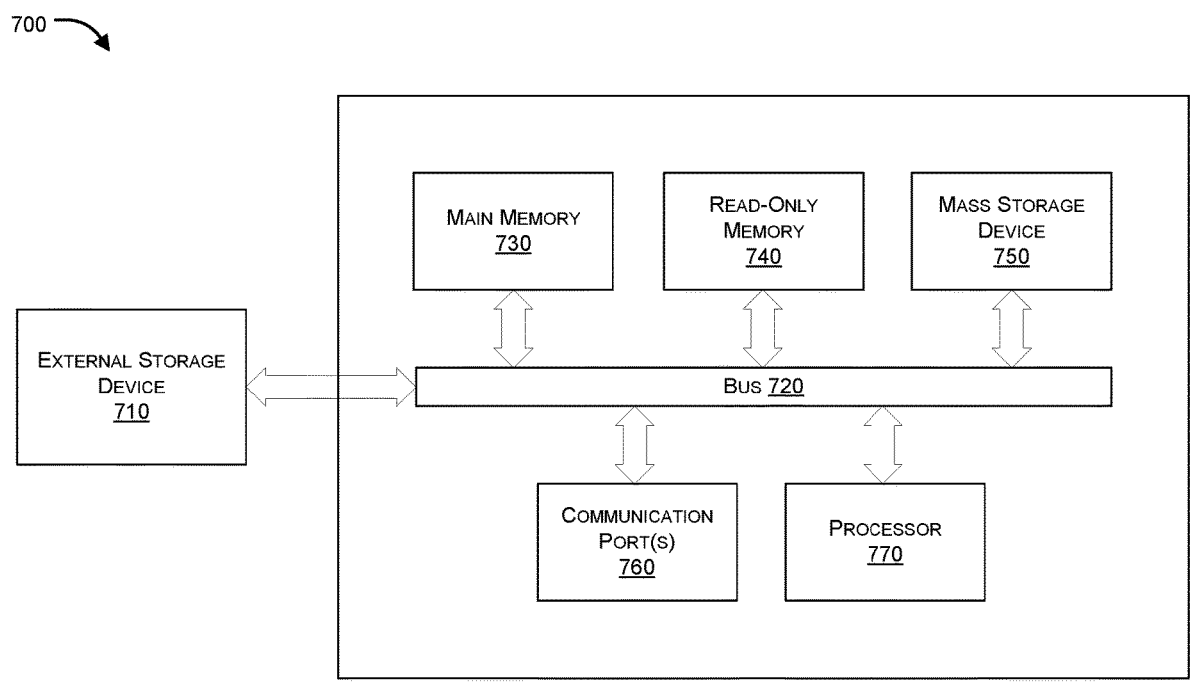
FIG. 7 illustrates an exemplary computer system in which or with which embodiments of the present invention may be utilized.

FIG. 7 illustrates an exemplary computer system in which or with which embodiments of the present invention may be utilized.

In an embodiment, proactive network security assessment based on benign variants of known threats can be implemented in computer system 700 to enable aspects of the present disclosure. Computer system 700 may represent an internal or external management server, a network component or a client device of network 104 or 304. Embodiments of the present disclosure include various steps, which have been described above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

In the context of the present example, computer system 700 includes an external storage device 710, a bus 720, a main memory 730, a read only memory 740, a mass storage device 750, communication port 760, and a processor 770. Those skilled in the art will appreciate that computer system 700 may include more than one processor and communication ports.

Examples of processor 770 include, but are not limited to, an Intel® Itanium® or Itanium 2 processor(s), or AMD® Opteron® or Athlon NIP® processor(s), Motorola® lines of processors, FortiSOC™ system on a chip processors or other future processors. Processor 770 may include various modules associated with embodiments of the present invention.

Communication port 760 can be any of an RS-232 port for use with a modem based dialup connection, a 10/100 Ethernet port, a Gigabit or 10 Gigabit port using copper or fiber, a serial port, a parallel port, or other existing or future ports. Communication port 760 may be chosen depending on a network, such a Local Area Network (LAN), Wide Area Network (WAN), or any network to which computer system 700 connects.

Memory 730 can be Random Access Memory (RAM), or any other dynamic storage device commonly known in the art. Read only memory 740 can be any static storage device(s) e.g., but not limited to, a Programmable Read Only Memory (PROM) chips for storing static information e.g., start-up or BIOS instructions for processor 770.

Mass storage 750 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 720 communicatively couples processor(s) 770 with the other memory, storage and communication blocks. Bus 720 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 770 to software system.

Optionally, operator and administrative interfaces, e.g. a display, keyboard, and a cursor control device, may also be coupled to bus 720 to support direct operator interaction with computer system 700. Other operator and administrative interfaces can be provided through network connections connected through communication port 760.

External storage device 710 can be any kind of external hard-drives, floppy drives, IOMEGA® Zip Drives, Compact Disc—Read Only Memory (CD-ROM), Compact Disc—Re-Writable (CD-RW), Digital Video Disk—Read Only Memory (DVD-ROM). Components described above are meant only to exemplify various possibilities. In no way should the aforementioned exemplary computer system limit the scope of the present disclosure.

While embodiments of the present disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

What is claimed is:

1. A method comprising:
   installing a monitoring agent on each of a plurality of computer systems of a private network;
   causing one or more of the plurality of computer systems and one or more users of a plurality of users of the private network to react to a benign variant of a network security threat, by deploying the benign variant of the network security threat within the private network, wherein the benign variant of the network security threat is created by leaving intact symptoms and propagation mechanisms associated with the network security threat and removing or disabling malicious behaviors of the network security threat;
   detecting activation, by the monitoring agent, of the benign variant of the network security threat on a computer system of the plurality of computer systems being used by a user of the plurality of users and resulting from a reaction of the user to the benign variant of the network security threat by monitoring activities of a process known to be associated with the benign variant of the network security threat;
   responsive to said detecting, capturing information, by the monitoring agent, regarding an identity of the user; and
   facilitating training of the user regarding proper security habits by reporting, by the monitoring agent, the captured information to a management server or to an administrator of the private network.

2. The method of claim 1, further comprising:
   responsive to said detecting, gathering information, by the monitoring agent, regarding a security configuration of the computer system; and
   reporting, by the monitoring agent, the gathered information to the management server.

3. The method of claim 1, further comprising:
   responsive to detecting propagation, by the monitoring agent, of the benign variant of the network security threat to an additional computer system of the plurality of computer systems, gathering information, by the monitoring agent, regarding a security configuration of the additional computer system; and
   facilitating proactive assessment of security of the private network by reporting, by the monitoring agent, the gathered information regarding each of the security configurations of the additional computer systems to which the benign variant of the network security threat was able to propagate.

4. The method of claim 1, wherein said deploying the benign variant of the network security threat comprises sending an email, having an attachment, to the one or more users, wherein the email employs social engineering to entice the plurality of users to open the attachment which contains therein the benign variant of the network security threat.

5. The method of claim 4, wherein the attachment is signed using a certificate that is trusted by the private network, thereby preventing blockage of the benign variant of the network security threat by security services implemented within the private network.

6. The method of claim 1, further comprising logging, by the monitoring agent, information regarding a plurality of milestones achieved or security holes exploited within the private network by the benign variant of the network security threat.

7. The method of claim 6, wherein prior to said deploying the benign variant of the network security threat, receiving, by the management server, information identifying critical systems, ports and network segments within the private network.

8. The method of claim 7, wherein the plurality of milestones achieved or security flaws observed include:
propagation or access by the benign variant of the network security threat to an identified critical system, port or network segment within the private network;
use by the benign variant of the network security threat of an identified critical system, port or network segment within the private network;
exploitation by the benign variant of the network security threat of a user permission level on the computer system; or
an ability by the benign variant of the network security threat to exploit an access level of a server within the private network.

9. A method comprising:
causing one or more computer systems of a plurality of computer systems of a private network and one or more users of a plurality of users of the private network to react to a benign variant of a network security threat, by deploying the benign variant of the network security threat within the private network, wherein the benign variant of the network security threat is created by leaving intact symptoms and propagation mechanisms associated with the network security threat and replacing malicious behaviors of the network security threat with one or more of tracking, monitoring and reporting behaviors implemented within the benign variant of the network security threat;
responsive to each activation of the benign variant of the network security threat on a particular computer system of the plurality of computer systems by a particular user of the plurality of users, capturing information, by the benign variant of the network security threat, regarding an identity of the particular user; and
facilitating training of the particular user regarding proper security habits by reporting, by the benign variant of the network security threat, the captured information to a management server.

10. The method of claim 9, further comprising:
responsive to each said activation of the benign variant of the network security threat, gathering information, by the benign variant of the network security threat, regarding a security configuration of each of the particular computer systems; and
reporting, by the benign variant of the network security threat, the gathered information to the management server.

11. The method of claim 9, further comprising:
responsive to each propagation of the benign variant of the network security threat to an additional computer system of the plurality of computer systems, gathering information, by the benign variant of the network security threat, regarding a security configuration of the additional computer system; and
facilitating proactive assessment of security of the private network by reporting, by the benign variant of the network security threat, the gathered information regarding each of the security configurations of the additional computer systems to which the benign variant of the network security threat was able to propagate.

12. The method of claim 9, wherein said deploying the benign variant of the network security threat comprises sending an email, having an attachment, to the one or more users, wherein the email employs social engineering to entice the plurality of users to open the attachment which contains therein the benign variant of the network security threat.

13. The method of claim 12, wherein the attachment is signed using a certificate that is trusted by the private network, thereby preventing blockage of the benign variant of the network security threat by security services implemented within the private network.

14. The method of claim 9, further comprising logging, by the benign variant of the network security threat, information regarding a plurality of milestones achieved or security holes exploited within the private network by the benign variant of the network security threat.

15. The method of claim 14, wherein prior to said deploying the benign variant of the network security threat, receiving, by the management server, information identifying critical systems, ports and network segments within the private network.

16. The method of claim 15, wherein the plurality of milestones achieved or security flaws observed include:
propagation or access by the benign variant of the network security threat to an identified critical system, port or network segment within the private network;
use by the benign variant of the network security threat of an identified critical system, port or network segment within the private network;
exploitation by the benign variant of the network security threat of a user permission level on the computer system; or
an ability by the benign variant of the network security threat to exploit an access level of a server within the private network.

17. The method of claim 1, wherein the plurality of computer systems comprise work stations of users of the private network.

18. The method of claim 1, wherein the plurality of computer systems comprise network security devices.

19. The method of claim 9, wherein the plurality of computer systems comprise work stations of users of the private network.

20. The method of claim 9, wherein the plurality of computer systems comprise network security devices.

21. A system comprising:
a processing resource; and
a non-transitory computer-readable medium, coupled to the processing resource, having stored therein instructions that when executed by the processing resource cause the processing resource to perform a method comprising:
causing one or more computer systems of a plurality of computer systems of a private network and one or more users of a plurality of users of the private network to react to a benign variant of a network security threat, by deploying the benign variant of the network security threat within the private network, wherein the benign variant of the network security threat is created by leaving intact symptoms and propagation mechanisms associated with the network security threat and replacing malicious behaviors of the network security threat with one or more of tracking, monitoring and reporting behaviors implemented within the benign variant of the network security threat and wherein responsive to each activation of the benign variant of the network security threat on a particular computer system of the plurality of computer systems by a particular user of the plurality of users, the benign variant of the network security threat captures information regarding an identity of the particular user; and facilitating training of the particular user regarding proper security habits by reporting by collecting and analyzing the captured information from the benign variant of the network security threat.

22. The system of claim 21, wherein responsive to each said activation of the benign variant of the network security threat, the benign variant of the network security threat gathers information regarding a security configuration of each of the particular computer systems, and wherein said collecting and analyzing includes collecting the gathered information from the benign variant of the network security threat.

23. The system of claim 21, wherein responsive to each propagation of the benign variant of the network security threat to an additional computer system of the plurality of computer systems, the benign variant of the network security threat gathers information regarding a security configuration of the additional computer system, and wherein the method further comprises facilitating proactive assessment of security of the private network by receiving from the benign variant of the network security threat the gathered information regarding each of the security configurations of the additional computer systems to which the benign variant of the network security threat was able to propagate.

24. The system of claim 21, wherein said deploying the benign variant of the network security threat comprises sending an email, having an attachment, to the one or more users, wherein the email employs social engineering to entice the plurality of users to open the attachment which contains therein the benign variant of the network security threat.

25. The system of claim 24, wherein blockage of the benign variant of the network security threat by security services implemented within the private network is prevented by associating with the attachment a certificate that is trusted by the private network.

26. The system of claim 21, wherein the method further comprises logging information regarding a plurality of security holes exploited within the private network by the benign variant of the network security threat.

27. The method of claim 21, wherein prior to said deploying the benign variant of the network security threat, receiving information identifying critical systems, ports and network segments within the private network.

28. The system of claim 27, further comprising logging information regarding a plurality of milestones achieved within the private network by the benign variant of the network security threat, and wherein the plurality of milestones achieved include:

propagation or access by the benign variant of the network security threat to an identified critical system, port or network segment within the private network;

use by the benign variant of the network security threat of an identified critical system, port or network segment within the private network;

exploitation by the benign variant of the network security threat of a user permission level on the particular computer system; or an ability by the benign variant of the network security threat to exploit an access level of a server within the private network.

29. The method of claim 9, wherein the plurality of computer systems comprise endpoint devices of users of the private network and network security devices.

* * * * *